United States Patent
Lee et al.

(10) Patent No.: US 8,861,963 B2
(45) Date of Patent: Oct. 14, 2014

(54) SHARED HIGH-INTENSITY BROADBAND LIGHT SOURCE FOR A WAVELENGTH-DIVISION MULTIPLE ACCESS PASSIVE OPTICAL NETWORK

(75) Inventors: Chang-Hee Lee, Daejon (KR); Tae Won Oh, Daejon (KR); Bong Soo Kim, Daejon (KR)

(73) Assignee: Novera Optics, Inc., Santa Clara, CA (US)

( * ) Notice: Subject to any disclaimer, the term of this patent is extended or adjusted under 35 U.S.C. 154(b) by 1558 days.

(21) Appl. No.: 10/559,013

(22) PCT Filed: Jun. 1, 2004

(86) PCT No.: PCT/IB2004/002187
§ 371 (c)(1),
(2), (4) Date: Mar. 21, 2007

(87) PCT Pub. No.: WO2006/005981
PCT Pub. Date: Jan. 19, 2006

(65) Prior Publication Data
US 2007/0274729 A1    Nov. 29, 2007

(30) Foreign Application Priority Data
May 30, 2003 (KR) .......... 10-2003-0034978

(51) Int. Cl.
*H04J 14/02* (2006.01)
*H04Q 11/00* (2006.01)
*H04B 10/50* (2013.01)
*H04J 14/06* (2006.01)

(52) U.S. Cl.
CPC ............ *H04J 14/02* (2013.01); *H04J 14/0247* (2013.01); *H04J 14/0246* (2013.01); *H04J 14/025* (2013.01); *H04J 14/0226* (2013.01); *H04J 14/0291* (2013.01); *H04J 14/0297* (2013.01); *H04B 10/506* (2013.01); *H04J 14/06* (2013.01); *H04J 14/0252* (2013.01); *H04J 14/0282* (2013.01)
USPC .................................. 398/68; 398/70; 398/90

(58) Field of Classification Search
USPC .............................. 398/61–64, 66, 68, 70, 90
See application file for complete search history.

(56) References Cited

U.S. PATENT DOCUMENTS

| | | | |
|---|---|---|---|
| 4,341,438 | A | 7/1982 | Seki et al. |
| 4,563,087 | A | 1/1986 | Bourbin et al. |

(Continued)

FOREIGN PATENT DOCUMENTS

| | | |
|---|---|---|
| EP | 0 060 033 A | 9/1982 |
| EP | 0 607 029 A | 7/1994 |

(Continued)

OTHER PUBLICATIONS

Amplified integrated star couplers with zero loss; H.M. Presby; C.R. Giles; Photonics Technology Letters, IEEE vol. 3, Issue 8, Aug. 1991 pp. 724-726.*

(Continued)

*Primary Examiner* — Nathan Curs
(74) *Attorney, Agent, or Firm* — Blakely, Sokoloff, Taylor & Zafman LLP (57) ABSTRACT

An optical power distributor is coupled to a high-intensity broadband light source to distribute in a shared manner an output of the high-intensity broadband light source to a plurality of optical line terminals. A depolarizer is also described having an input coupled to an output of a polarized broadband light source. A first integrated module has optical transmitters and an optical wavelength router for a first band. A second integrated module has optical receivers and an optical wavelength router for a second band.

9 Claims, 9 Drawing Sheets

(56) References Cited

U.S. PATENT DOCUMENTS

| | | |
|---|---|---|
| 4,912,526 A | 3/1990 | Iwaoka et al. |
| 4,947,134 A | 8/1990 | Olsson |
| 5,064,263 A | 11/1991 | Stein |
| 5,117,303 A | 5/1992 | Desurvire et al. |
| 5,202,780 A | 4/1993 | Fussanger |
| 5,221,983 A | 6/1993 | Wagner |
| 5,251,001 A | 10/1993 | Dave et al. |
| 5,251,054 A | 10/1993 | Lynn |
| 5,276,543 A | 1/1994 | Olshansky |
| 5,307,366 A | 4/1994 | Auffret et al. |
| 5,321,541 A | 6/1994 | Cohen |
| 5,347,525 A | 9/1994 | Faris |
| 5,379,309 A | 1/1995 | Logan, Jr. et al. |
| 5,408,349 A | 4/1995 | Tsushima et al. |
| 5,412,673 A | 5/1995 | Caprara et al. |
| 5,418,183 A | 5/1995 | Joyner et al. |
| 5,434,662 A | 7/1995 | Rockwell et al. |
| 5,436,760 A | 7/1995 | Nakabayashi |
| 5,440,417 A | 8/1995 | Chung et al. |
| 5,491,573 A | 2/1996 | Shipley |
| 5,550,666 A | 8/1996 | Zirngibl |
| 5,589,970 A | 12/1996 | Lyu et al. |
| 5,600,471 A | 2/1997 | Hirohashi et al. |
| 5,625,478 A | 4/1997 | Doerr et al. |
| 5,646,774 A | 7/1997 | Takara et al. |
| 5,661,585 A | 8/1997 | Feldman et al. |
| 5,694,234 A | 12/1997 | Darcie et al. |
| 5,717,795 A * | 2/1998 | Sharma et al. .................. 385/24 |
| 5,773,345 A | 6/1998 | Ota |
| 5,793,512 A | 8/1998 | Ryu |
| 5,796,502 A | 8/1998 | Haller, Jr. |
| 5,812,572 A | 9/1998 | King et al. |
| 5,835,517 A | 11/1998 | Jayaraman et al. |
| 5,841,557 A | 11/1998 | Otsuka et al. |
| 5,864,414 A | 1/1999 | Barnsley et al. |
| 5,880,865 A | 3/1999 | Lu et al. |
| 5,894,247 A | 4/1999 | Yoshida et al. |
| 5,907,417 A | 5/1999 | Darcie et al. |
| 5,920,414 A | 7/1999 | Miyachi et al. |
| 5,936,752 A | 8/1999 | Bishop |
| RE36,471 E | 12/1999 | Cohen |
| 6,034,799 A | 3/2000 | Hansen |
| 6,081,355 A * | 6/2000 | Sharma et al. .................. 398/90 |
| 6,097,523 A | 8/2000 | Boot |
| 6,120,190 A | 9/2000 | Mirman et al. |
| 6,134,037 A | 10/2000 | Shabeer et al. |
| 6,134,250 A | 10/2000 | Koren et al. |
| 6,137,611 A | 10/2000 | Boivin et al. |
| 6,178,001 B1 | 1/2001 | Kim |
| 6,192,170 B1 | 2/2001 | Komatsu |
| 6,195,200 B1 | 2/2001 | DeMarco |
| 6,304,350 B1 | 10/2001 | Doerr et al. |
| 6,307,668 B1 | 10/2001 | Bastien et al. |
| 6,310,720 B1 | 10/2001 | Walker et al. |
| 6,323,994 B1 | 11/2001 | Li et al. |
| 6,437,907 B1 | 8/2002 | Yoon et al. |
| 6,469,649 B1 | 10/2002 | Helkey et al. |
| 6,470,036 B1 | 10/2002 | Bailey et al. |
| 6,498,869 B1 | 12/2002 | Yao |
| 6,498,871 B1 | 12/2002 | Kuboki |
| 6,597,482 B1 | 7/2003 | Chung et al. |
| 6,600,760 B1 | 7/2003 | Green et al. |
| 6,603,599 B1 | 8/2003 | Wang et al. |
| 6,650,840 B2 | 11/2003 | Feldman |
| 6,654,401 B2 | 11/2003 | Vieira et al. |
| 6,674,969 B1 | 1/2004 | Ogusu |
| 6,711,313 B2 | 3/2004 | Takiguchi et al. |
| 6,771,358 B1 | 8/2004 | Shigehara et al. |
| 6,868,200 B2 | 3/2005 | Kimotsuki et al. |
| 6,868,236 B2 | 3/2005 | Wiltsey et al. |
| 6,888,856 B2 | 5/2005 | Green et al. |
| 6,941,074 B2 | 9/2005 | Nakamura et al. |
| 7,006,719 B2 | 2/2006 | Joyner et al. |
| 7,075,712 B2 | 7/2006 | Kinoshita et al. |
| 7,092,595 B2 | 8/2006 | Sorin et al. |
| 7,106,974 B2 | 9/2006 | Lee et al. |
| 7,171,123 B2 | 1/2007 | Lee et al. |
| 7,254,344 B2 | 8/2007 | Kim et al. |
| 7,313,157 B2 | 12/2007 | Sorin et al. |
| 7,327,957 B2 | 2/2008 | Lee et al. |
| 7,349,631 B2 | 3/2008 | Lee et al. |
| 7,403,718 B2 | 7/2008 | Matthews et al. |
| 7,415,205 B2 | 8/2008 | Shin et al. |
| 7,593,444 B2 | 9/2009 | Sorin et al. |
| 7,613,998 B2 | 11/2009 | Wiedenberg |
| 7,627,246 B2 | 12/2009 | Sorin et al. |
| 2001/0004290 A1 | 6/2001 | Lee et al. |
| 2001/0013962 A1 | 8/2001 | Li et al. |
| 2001/0046364 A1 | 11/2001 | Ajima et al. |
| 2002/0039465 A1 | 4/2002 | Skinner |
| 2002/0067526 A1 | 6/2002 | Park et al. |
| 2002/0068859 A1 | 6/2002 | Knopp |
| 2002/0071173 A1 | 6/2002 | Lee et al. |
| 2002/0097768 A1 | 7/2002 | Thornton |
| 2002/0126345 A1 | 9/2002 | Green et al. |
| 2002/0196491 A1 | 12/2002 | Deng et al. |
| 2003/0007207 A1 | 1/2003 | Healy et al. |
| 2003/0039010 A1 * | 2/2003 | Akimoto et al. ............... 359/152 |
| 2003/0053174 A1 * | 3/2003 | Rosenfeldt ................... 359/161 |
| 2003/0058500 A1 | 3/2003 | Sugawara |
| 2003/0076560 A1 | 4/2003 | Pratt et al. |
| 2003/0095736 A1 | 5/2003 | Kish, Jr. et al. |
| 2003/0128917 A1 | 7/2003 | Turpin et al. |
| 2003/0142978 A1 | 7/2003 | Lee et al. |
| 2003/0165006 A1 | 9/2003 | Stephens et al. |
| 2003/0205706 A1 | 11/2003 | Lin et al. |
| 2003/0206740 A1 * | 11/2003 | Lee et al. .................... 398/79 |
| 2003/0223672 A1 | 12/2003 | Joyner et al. |
| 2003/0223761 A1 | 12/2003 | Brown et al. |
| 2004/0033004 A1 | 2/2004 | Welch et al. |
| 2004/0033076 A1 | 2/2004 | Song et al. |
| 2004/0067059 A1 | 4/2004 | Song et al. |
| 2004/0131358 A1 | 7/2004 | Jung et al. |
| 2004/0136716 A1 | 7/2004 | Jung et al. |
| 2004/0175188 A1 | 9/2004 | Bellemare et al. |
| 2004/0184805 A1 | 9/2004 | Shin et al. |
| 2004/0184806 A1 | 9/2004 | Lee et al. |
| 2004/0208208 A1 | 10/2004 | Shin et al. |
| 2004/0264400 A1 | 12/2004 | Lee et al. |
| 2005/0135449 A1 | 6/2005 | Sorin et al. |
| 2005/0147412 A1 | 7/2005 | Park et al. |
| 2005/0152696 A1 | 7/2005 | Shin et al. |
| 2005/0163503 A1 | 7/2005 | Lee et al. |
| 2005/0259989 A1 | 11/2005 | Sorin et al. |
| 2005/0286895 A1 | 12/2005 | Lee et al. |
| 2006/0002706 A1 | 1/2006 | Lee et al. |
| 2006/0045542 A1 | 3/2006 | Chu et al. |
| 2006/0093360 A1 | 5/2006 | Kim et al. |
| 2006/0262324 A1 | 11/2006 | Hays et al. |
| 2006/0263090 A1 * | 11/2006 | Lee et al. .................... 398/79 |
| 2007/0014509 A1 | 1/2007 | Kish, Jr. et al. |
| 2007/0081823 A1 | 4/2007 | Lee et al. |
| 2007/0274729 A1 | 11/2007 | Lee et al. |
| 2008/0089692 A1 | 4/2008 | Sorin et al. |
| 2008/0137698 A1 | 6/2008 | Sorin et al. |
| 2008/0232805 A1 | 9/2008 | Lee et al. |
| 2010/0221008 A1 | 9/2010 | Lee et al. |

FOREIGN PATENT DOCUMENTS

| | | |
|---|---|---|
| EP | 0 688 114 A | 12/1995 |
| EP | 0 844 706 A2 | 5/1998 |
| EP | 0 844 706 A3 | 2/1999 |
| EP | 0 991 217 A2 | 4/2000 |
| EP | 1 024 541 A | 8/2000 |
| EP | 1 089 098 A | 4/2001 |
| EP | 1124296 | 8/2001 |
| EP | 1 195 867 A1 | 4/2002 |
| EP | 1 388 963 A2 | 2/2004 |
| GB | 2 122 371 A | 1/1984 |
| JP | 61-114624 | 6/1986 |
| JP | 02-261236 | 10/1990 |
| JP | 06-252860 | 9/1994 |
| JP | 8 -163097 | 6/1996 |

(56) References Cited

FOREIGN PATENT DOCUMENTS

| | | |
|---|---|---|
| JP | 09-233052 | 9/1997 |
| JP | 10-23478 | 1/1998 |
| JP | 11-211924 | 8/1999 |
| JP | 2000-174397 | 6/2000 |
| JP | 2000-196536 | 7/2000 |
| JP | 2000-292636 | 10/2000 |
| JP | 2001-127377 | 5/2001 |
| JP | 2001-188140 | 7/2001 |
| JP | 2001-203643 | 7/2001 |
| JP | 2001-230733 | 8/2001 |
| JP | 2001-257658 | 9/2001 |
| JP | 2001-356377 | 12/2001 |
| JP | 2002-141927 | 5/2002 |
| JP | 2002-270949 | 9/2002 |
| JP | 2002-374207 | 12/2002 |
| JP | 2003-14963 | 1/2003 |
| JP | 2003-017798 | 1/2003 |
| JP | 2003-69502 | 3/2003 |
| JP | 2003-124893 | 4/2003 |
| JP | 2003-124911 | 4/2003 |
| JP | 2003-134058 | 5/2003 |
| JP | 2004-159328 | 6/2004 |
| KR | 00-33946 | 6/2000 |
| KR | 10-2000-0033946 A | 6/2000 |
| KR | 00-39036 | 7/2000 |
| KR | 2001-0063062 | 7/2001 |
| KR | 01-93921 | 10/2001 |
| KR | 10-2002-0003318 | 1/2002 |
| KR | 2002-0005326 | 1/2002 |
| KR | 0325687 | 2/2002 |
| KR | 10-2003-0063085 A | 7/2003 |
| KR | 10-2003-0065632 A | 8/2003 |
| KR | 10-2003-0086223 A | 11/2003 |
| KR | 10-2002-0083410 | 1/2004 |
| KR | 10-2004-0023305 A | 3/2004 |
| KR | 10-2004-0025304 A | 3/2004 |
| KR | 0454887 | 10/2004 |
| KR | 10-2004-0103085 A | 12/2004 |
| KR | 0496710 | 6/2005 |
| KR | 10-0515259 | 9/2005 |
| KR | 10-2006-0042486 A | 5/2006 |
| KR | 10-2007-002122 | 2/2007 |
| KR | 10-0680815 | 2/2007 |
| WO | WO 97/49248 A1 | 12/1997 |
| WO | WO 98/32196 | 7/1998 |
| WO | WO 98/45974 A2 | 10/1998 |
| WO | WO 99/37002 A1 | 7/1999 |
| WO | WO 99/59010 A1 | 11/1999 |
| WO | WO 00/05788 | 2/2000 |
| WO | WO 00/10271 | 2/2000 |
| WO | WO 03/032547 A2 | 4/2003 |
| WO | WO 03/063401 A2 | 7/2003 |
| WO | WO 03/065621 A1 | 8/2003 |
| WO | WO 03/102659 | 12/2003 |
| WO | WO 03/107057 A1 | 12/2003 |
| WO | WO 2004/028047 A1 | 4/2004 |
| WO | WO 2004/034621 A2 | 4/2004 |
| WO | WO 2004/034621 A3 | 4/2004 |
| WO | WO 2004/047344 | 6/2004 |
| WO | WO 2004/107628 A1 | 12/2004 |
| WO | WO 2005/069516 A1 | 7/2005 |
| WO | WO 2005/099148 A1 | 10/2005 |
| WO | WO 2006/005981 A1 | 1/2006 |
| WO | WO 2007/027042 A1 | 3/2007 |

OTHER PUBLICATIONS

Kim, H.D. et al., "A Low Cost WDM Source with an ASE Injected Fabry-Perot Semiconductor Laser," IEEE Photonics Technology Letters, vol. 12, No. 8, pp. 1067-1067, Aug. 2000.
PCT Notification of Transmittal of the International Search Report and the Written Opinion of the International Searching Authority or the Declaration for PCT Counterpart Application No. PCT/IB2004/002187 Containing International Search Report, 7 pgs. (Sep. 17, 2007).
PCT Notification Concerning Transmittal of International Preliminary Report on Patentability (Chapter 1 of the Patent Cooperation Treaty)for PCT Counterpart Application No. PCT/IB2004/002187 Containing International Search Report, 4 pgs. (Oct. 25, 2007).
Haruna, Masamitsu et al., "Optical Waveguide Power Distributor and Multichannel Modulator and Demodulator," Piezo-Electricity and Acousto-optic, No. 4 of 1983, pp. 58-67, Apr. 1983.
Jinshan, Xie "Application of Wavelength Division Multiplexing (WDM) Technology in Passive Optical Network," Development of Laser and Optoelectronics (Supplement), No. 9 of 1999, pp. 67-70, Sep. 1999.
Youlong, Yu et al., "Study on a Novel High Power Broadband Light Source," Chinese Journal of Lasers, vol. A28, No. 1, pp. 71-73, Jan. 2001.
Yunfeng, Shen et al., "The Research on Layering Structure and Network Management of Photonic Transport Networks," Journal of China Institute of Communications, vol. 19, No. 7, pp. 18-24, Jul. 1998.
Feldman, Robert D. et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).
Takahashi, H. et al., "Transmission characteristics of arrayed-waveguide N×N wavelenth multiplexer," IEEE Photonic Technology Letters, vol. 13, No. 3, pp. 447-455 (Mar. 1995).
International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).
J. Heanue et al., "Widely Tunable Laser Module using DFB Array and MEMS Selection with Internal Wavelength Locker", OFC 2003/vol. 1, pp. 82-83.
B. Pezeshki et al., "12 Element Multi-wavelength DFB Arrays for Widely Tunable Laser Modules", OFC 2002, pp. 711-712.
Jae-Seung Lee, "Signal-to-Noise Ratio Measurement of a 2.5-Gb/s Spectrum-Sliced Incoherent Light Channel," IEEE Photonics Technology Letters, vol. 9, No. 1, pp. 94-96 (Jan. 1997).
Derek Mayweather, et al., "Wavelength Tracking of a Remote WDM Router in a Passive Optical Network," XP000624886, IEEE Photonics Technology Letters, vol. 8, No. 9, pp. 1238-1240 (Sep. 1, 1996).
Database WPI, Section E1, Week 200011, Derwent Publications ltd., London, GB, AN 2001-098850, XP002276043.
D.K. Jung, et al., "Wavelength-Division-Multiplexed Passive Optical Network Based on Sprectrum-Slicing Techniques," IEEE Photonics Technology Letters, vol. 10, No. 9, pp. 1334-1336 (Sep. 1998).
J.S. Lee, et al., "Sprectrum-Sliced Fiber Amplifier Light Source for Multichannel WDM Applications," IEEE Photonics Technology Letters, vol. 5, No. 12, pp. 1458-1461 (Dec. 1993).
P. Healey, et al., "Spectral Slicing WDM-PON Using Wavelength-Seeded Reflective SOAs," Electronics Letters, vol. 37, No. 19, pp. 1181-1182 (Sep. 13, 2001).
Qiao Yaojun, et al., "A New Scheme for WDM-Based Passive Optical Access Network," 4 pgs. (2000).
S.V. Kartalopoulos, Introduction to DWDM Technology: Data in a Rainbow, pp. 56-57 (2000).
K. Petermann, "Laser Diode Modulation and Noise," Noise Characteristics of Solitary Laser Diodes, Section 7.3.2 Mode partition noise pp. 163-166 (1991).
Oh, Tae-Won et al., "Broadband Light Source for Wavelength-Division Multiple Access Passive Optical Network," Dept. of Electrical Engineering, Korea Advanced Institute of Science and Technology and Novera Optics Korea, Inc., Nov. 29, 2007, OECC 2003.
D.D. Sampson, et al., "100mW Sprectrally-Uniform Broadband ASE Source for Sprectrum-Sliced WDM Systems," XP006001052, Electronics Letters, vol. 30, No. 19, pp. 1611-1612 (Sep. 15, 1994).
McMahon, Donald H., et al."Echelon grating multiplexers for hierachically multiplexed fiber-optic communication networks," Applied Optics, vol. 26, No. 11, pp. 2188-2196 (Jun. 1, 1987).
Jung, et al., "Spectrum-Sliced Bidirectional WDM PON," Optical Fiber Communication Conference, vol. 2, pp. WJ6-2 to WJ6-4 (2000).

(56) References Cited

OTHER PUBLICATIONS

Zah, C., et al., "Amplifiers with Angled Facets, Fabrication and Performance of 1.5MUM GAINASP Traveling-Wave Laser," Electronics Letters, IEE Stevenage, GB, vol. 23, No. 19, Sep. 10, 1987, pp. 990-992, XP000710298, ISSN: 0013-5194.

Chang-Hasnain et al., "Integrated external cavity quantum well laser array using single eptaxial growth on a patterned substrate," Applied Physics Letters, Vo. 56, No. 5, Jan. 1990.

Zirngibl, M., et al., "An 18-Channel Mulitfrequency Laser," IEEE Photonics Technology Letters, vol. 9, No. 7, Jul. 1996, pp. 870-872 (3 pages).

Zirngibl, M., et al., "Study of Spectal Slicing for Local Access Applications," IEEE Photonics Technology Letters, vol. 8, No. 5, pp. 721-723 (May 1996).

Woodward, S.L., et al., "A Spectrally Sliced PON Employing Fabry-Perot Lasers," IEEE Photonics Technology Letters, vol. 10, No. 9, pp. 1337-1339 (Sep. 1998).

Iwashita, Katsushi, et al., "Suppression of Mode Partition Noise by Laser Diode Light Injections," IEEE Journal of Quantum Electronics, vol. QE-18, No. 10, pp. 1669-1674 (Oct. 1982).

Feuer, M.D., et al., "Singe-Port Laser-Amplifier Modulators for Local Access," IEEE Photonics Technology Letters, vol. 8, No. 9, pp. 1175-1177 (Sep. 1996).

Shin, et al., "155 Mbit/s TrasmissionUsing ASE-Injected Fabry-Perot Laser Diode in WDM-PON over 70^0C Temperature Rage," Electronics Letters, Sep. 4, 2003, vol. 39, No. 18, pp. 1331-1332.

Choi, K.M., "Broadband Light Source by Mutually Injected FP-LD's" OECC/COIN 2004, Jan. 1, 2004, pp. 882-884, XP009126452.

Jin, Xiaomin, et al., "Bandwidth enhancement of Fabry-Perot quantum-well lasers by injection-locking" Jun. 12, 2006, Solid-State Electronics, p. 1141-9.

Takachio, N., et al., "Wide Area Gigabit Access Network based on 12.5GHz Spaced 256 Channel Super-Dense WDM Technologies", Electronic Letters, vol. 35, No. 5, XP6016306, 2 pgs., (Mar. 1, 2001).

Baik, J., et al., "Wavelength Self-Managed Optical WDM Source Using Polarization-Multiplexed Fabry-Perot Laser Diodes", IEEE Photonics Technology Letters, vol. 16, No. 10, Oct. 2004.

Kikuchi, Kazuro "Effect of 1/f-Type FM Noise on Semiconductor-Laser Linewidth Residual in High-Power Limit", IEEE Journal of Quantum Electronics, vol. 25, No. 4, Apr. 1989, pp. 684-688.

L.Y. Chan, et al., "Upstream traffic transmitter using injection-locked Fabry-Perot laser diode as modulator for WDM access networks," XP006017703, Electronic Letters, vol. 38, No. 1, pp. 43-45 (Jan. 3, 2002).

Dong Jae Shin, et al., "Hybrid WDM/TDM-PON with Wavelength-Selection-Free Transmitters," Journal of Lightwave Technology, vol. 23, No. 1, pp. 187-195 (Jan. 2005).

E. Wong, et al., "Low-cost WDM passive optical network with directly-modulated self-seeding reflective SOA," Electronics Letters, vol. 42, No. 5, 2 pages (Mar. 2, 2006).

Wai Hung, et al., "An Optical Network Unit for WDM Access Networks with Downstream DPSK and Upstream remodulated OOK Data Using Injection-Locked FP Laser," IEEE Photonics Technology Letters, vol. 15, No. 10, pp. 1476-1478 (Oct. 10, 2003).

Kurtz, Russell M., et al., "Mutual Injection Locking: A New Architecture for High-Power Solid-State Laser Arrays", May/Jun. 2005, IEEE Journal of Selected Topics in Quantum Electronics, vol. 11, No. 3, pp. 578-586.

* cited by examiner

SHARED HIGH-INTENSITY BROADBAND LIGHT SOURCE FOR A WAVELENGTH-DIVISION MULTIPLE ACCESS PASSIVE OPTICAL NETWORK

CROSS-REFERENCE TO RELATED APPLICATION

This application is a National Phase application of International Application No. PCT/IB2004/002187, filed Jun. 1, 2004, which claims priority from South Korean patent application number 2003-0034978, filed May 30, 2003, entitled Wavelength-Division Multiple Access Passive Optical Network Using the Incoherent Broadband Light Source, which is hereby incorporated by reference.

FIELD

Embodiments of the invention relate to the field of wavelength-division multiple access passive optical networks. More particularly, embodiments of the invention relate to the sharing of a high-intensity broadband light source by optical line terminals of the wavelength-division multiple access passive optical network. Embodiments of the invention also relate to depolarizing broadband light sources. Further embodiments relate to two separate optical modules.

BACKGROUND

Figure 1:
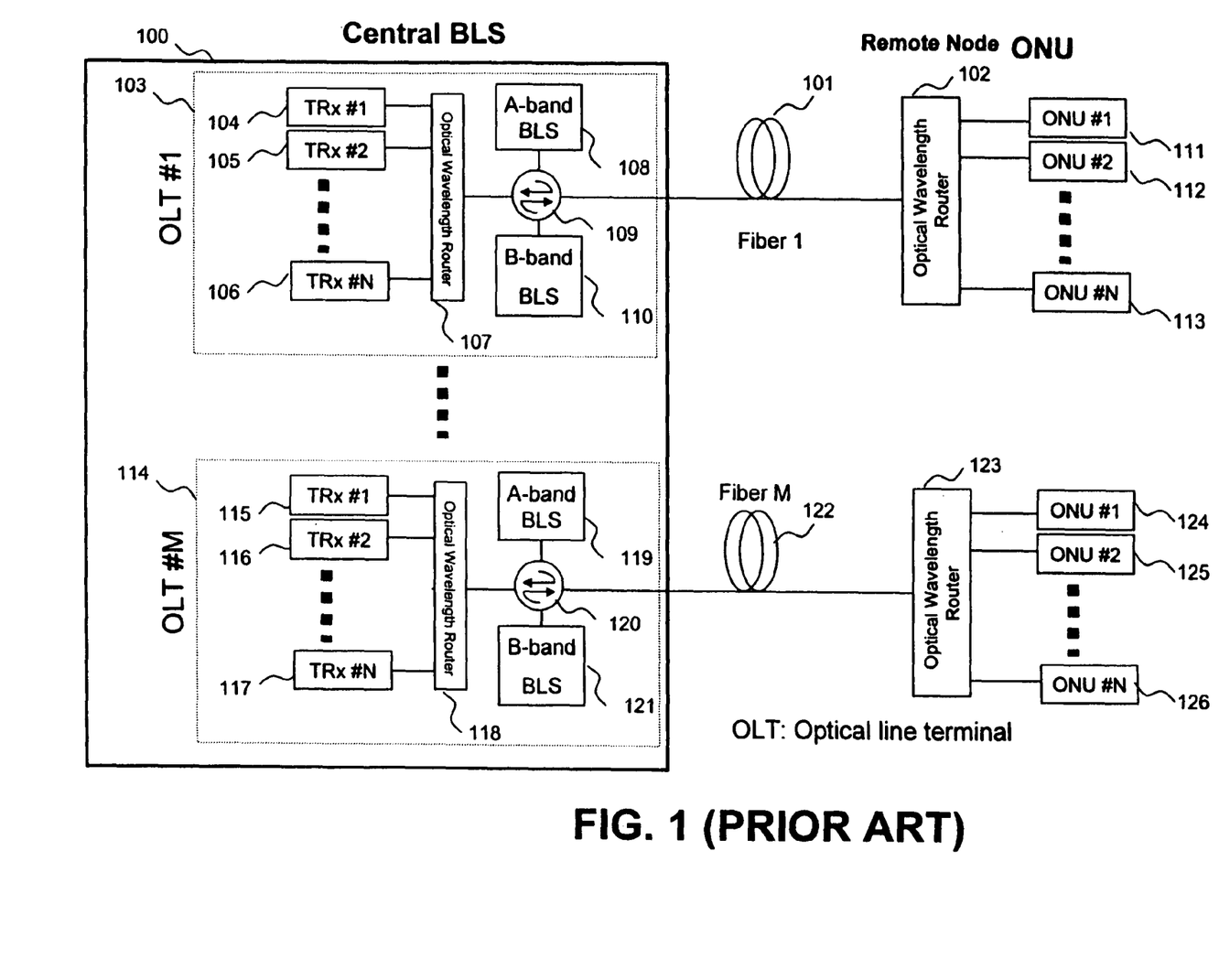
FIG. 1 is a block diagram of a prior art wavelength-division multiple access passive optical network using injected light with multiple optical line terminals in a central office.

FIG. 1 is a block diagram of a prior art wavelength-division multiple access ("WDM") passive optical network ("PON") that uses injected light. The passive optical network has optical line terminals ("OLTs") 103 and 114 within the central base station 100, optical lines 101 and 122 for transmission, remote nodes 102 and 123, and optical network (subscriber) units ("ONUs") 111-113 and 124-126. For wavelength-division multiple access using injected light, the optical line terminals 103 and 114 have respective optical line terminals 103 and 114; optical transceivers 104-106 and 115-117; optical wavelength routers 107 and 118; broadband light sources 108, 110, 119, and 121; and broadband light source couplers 109 and 120.

Broadband light source couplers 109 and 120 supply the injected light. The broadband light source coupler 109 has 4-port optical elements and is described in South Korean Patent Application Number 2002-5326, filed Jan. 30, 2002, entitled Method and Apparatus for Decreasing and Compensating the Transmission Loss at a Wavelength-Division-Multiplexed Passive Optical Network and Apparatus Therfor. Broadband light source coupler 109 directs broadband light from the A-band broadband light source 108 to transmission line 101 to eventually be supplied to transmitters in the subscriber locations. Broadband light source ("BLS") coupler 109 also directs the upstream signals of A-band broadband light from the transmission line 101 to the optical wavelength router 107. The broadband light source coupler 109 also directs broadband light from B-band broadband light source 110 to the optical wavelength router 107. Broadband light source coupler 109 transmits downstream signals of the wavelength-locked transceivers 104-106 from the optical wavelength router 107 to transmission line 101.

The A-band broadband light source 108 is used as an injected light of the optical transmitter of the optical subscriber, such as ONU 111. The B-band broadband light source 110 is used as an injected light of the optical transmitter within the optical line terminal. An injected light is injected into an optical transmitter.

A broadband light generated from the B-band broadband light source 110 is transmitted to the optical wavelength router 107 by the broadband light source coupler 109. The B-band broadband light is divided into wavelength segments by the optical wavelength router 107, and split wavelength segments of lights are used as injected light for optical transceivers 104-106.

The A-band and B-band designations are intended to be generic designations to cover different wavelength ranges, such as the C-band and L-band.

A Fabry-Perot laser diode, a semiconductor optical amplifier, or an optical modulator can be used as an optical transmitter in the optical transceiver. This transmitter modulates and amplifies the injected light to send optical signals. The principle of the A-band broadband light source 108 is similar to that of downstream signals.

The components of optical line terminal 114 operate in a similar manner to the components of optical line terminal 103.

Because a number of optical line terminals (e.g., OLT#1 through OLT#M) are positioned within central base station 100, the efficient configuration of the optical lines terminals (such as 103 and 114) is essential to reducing physical space, reducing cost, and reducing power consumption.

Prior art technology can be used for an optical network, and certain prior art technology is discussed in (1) an article by H. D. Kim, S. -G. Kang, and C. -H. Lee entitled *A Low Cost WDM Source with an ASE Injected Fabry-Perot Semiconductor Laser*, IEEE Photonics Technology Letters, Vol. 12, No. 8, pp. 1067-1069 (August 2000), (2) South Korean Patent Application No. 990059923, filed Dec. 21, 1999, which is publication number 20010063062 A, published Jul. 9, 2001, issued as South Korean Patent No. 325687, entitled Light Source For Wavelength Division Multiplexing (WDM) Optical Communication Using Fabry-Perot Laser Diode, and (3) U.S. patent application publication no. US 2003/0007207 A1, published Jan. 9, 2003 by Peter Healy et al. entitled Optical Signal Transmitter. For certain prior art optical networks, a number of optical networks are connected from one central base station. For certain prior art technology, the central base station independently requires a number of optical line terminals. A disadvantage of the prior art scheme of FIG. 1 is that the scheme requires much space and can be relatively costly.

SUMMARY

Embodiments of the invention have been devised to resolve the problems of the existing technology described above. A purpose of the embodiments of the invention is to implement an optical line terminal suitable for numerous wavelength-division multiple access optical networks.

For one embodiment of the invention, a high-intensity broadband light source is shared, replacing multiple lower-intensity broadband light sources. This simplifies equipment in the central base station. This simplifies the configuration of the optical line terminals. This decreases the space requirements. A cost reduction is possible because the broadband light source is shared.

For one embodiment, the high-intensity broadband light source is shared by numerous optical line terminals that are part of a wavelength-division multiple access passive optical network using injected light. The passive optical network includes a central base station, remote nodes, and optical subscribers. The central base station has numerous optical line terminals for various passive optical networks.

An advantage of an embodiment of the invention is the efficient configuration of numerous optical line terminals for a wavelength-division multiple access passive optical network.

An advantage of an embodiment of the invention is the ability to provide broadband transmission capacity without optical wavelength control of optical transceivers.

Other features and advantages of embodiments of the invention will be apparent from the accompanying figures and from the detailed description that follows below.

BRIEF DESCRIPTION OF THE DRAWINGS

Embodiments of the present invention are illustrated by way of example and not limitation in the accompanying figures, in which like references indicate similar elements, and in which.

DETAILED DESCRIPTION

Figure 2:
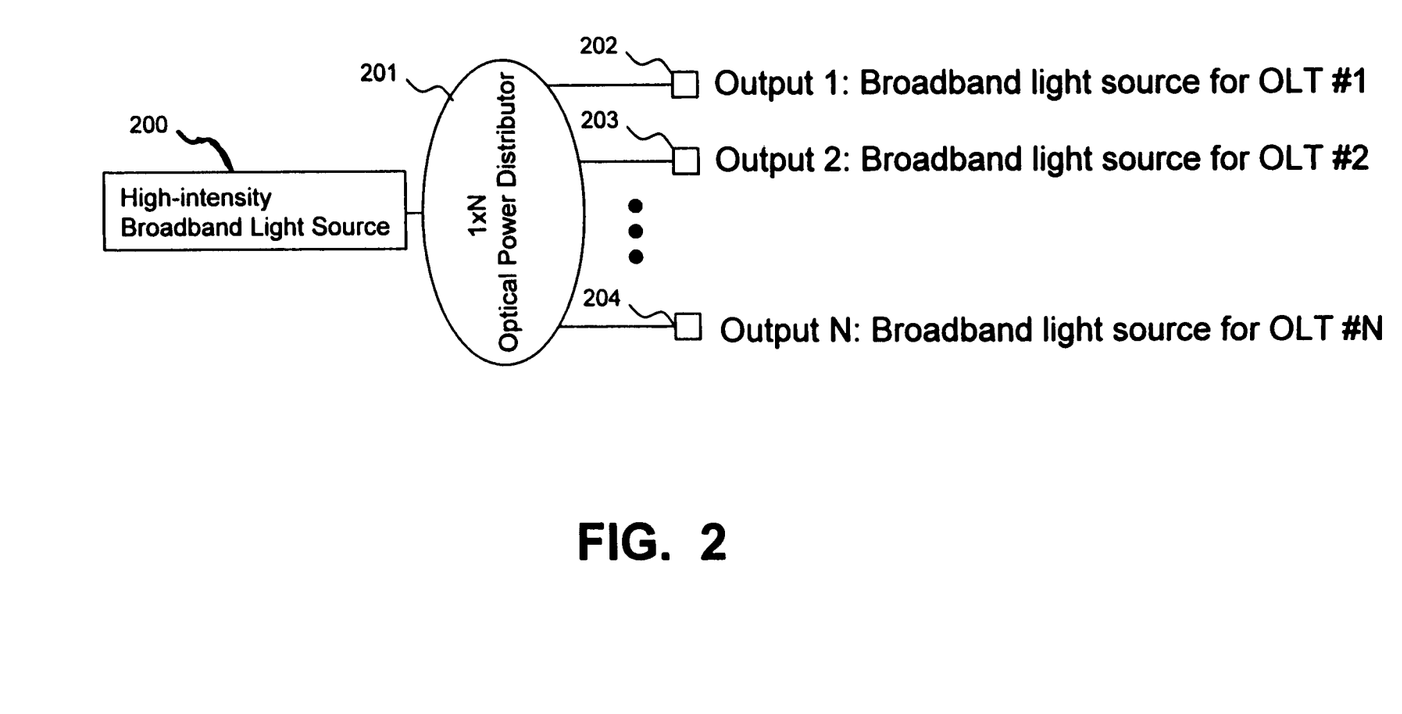
FIG. 2 shows of an embodiment of the invention wherein a broadband light source is shared by numerous optical line terminals.

FIG. 2 illustrates a way of using a single high-intensity broadband light source 200 that is shared by optical line terminals 202-204. The high-intensity broadband light source 200 generates incoherent light at a broadband wavelength. For various embodiments of the invention, the high-intensity broadband light source 200 can either comprise an Erbium-doped fiber amplifier, a nonlinear optical amplifier, or a semiconductor broadband light source. Examples of high-intensity broadband light sources are described in PCT application number PCT/US 03/36180, filed Nov. 14, 2003, entitled Methods and Apparatuses to Provide a Broadband Light Source With Two or More Output Ports. For one embodiment, the high-intensity broadband light source 200 is an Erbium-doped fiber amplifier supplied by Highwave Optical Technologies of Rue Paul Sabatier, 22302 Lannion Cedex, France. For an alternative embodiment, another type of high-intensity broadband light source could be used, including a coherent light source. The output optical power of a broadband light source can be raised to become a high-intensity broadband light source through a pumping light increase or through process improvement. For one embodiment, the high-intensity broadband light source 200 supplies output light with a power of approximately one watt. For other embodiments, other high output powers are supplied.

The embodiment of FIG. 2 enables a number of optical line terminals OLT#1 through OLT#N to share high-intensity broadband light source 200. The output of high-intensity broadband light source 200 is injected into 1×N optical power distributor 201. The 1×N optical power distributor 201 distributes injected light to an N number of output ports 202-204. Each of the output ports 202-204 is connected to the respective broadband light source coupler of each of the optical line terminals 202-204.

For one embodiment, the optical power distributor 201 is a fiber optic directional coupler comprised of fused couplers. For another embodiment, the optical power distributor 201 is comprised of planar lightwave circuits.

On the whole, the savings provided by the configuration of FIG. 2 due to the higher optical output of high-intensity broadband light source 200 offset the higher cost of a high-intensity broadband light source 200 versus a typical lower-intensity broadband light source. Therefore, it is more cost-efficient to use a single high-intensity broadband light source 200 shared by optical line terminals 202-204, wherein optical output strength has been increased and distributed, in comparison to a plurality of lower-intensity broadband light sources. Also, because high-intensity broadband light source 200 replaces an N number of lower-intensity (i.e., regular intensity) broadband light sources, the amount of space required decreases in comparison with the use of prior art regular-intensity broadband light sources. The embodiment of FIG. 2 also heightens the degree of integration and reduces power consumption.

Although FIG. 2 shows one high-intensity broadband light source 200, for one embodiment of the invention that broadband light source is only for the A-band, such as a bandwidth of 1580 to 1610 nanometers (i.e., the L-band). For one embodiment, the configuration of FIG. 2 is repeated for the B-band, with the high-intensity broadband light source 200 providing a wavelength of 1540 to 1566 nanometers (i.e., the C-band). For alternative embodiments, other bands may be used, such as the S-band (1440 to 1466 nanometers). For another embodiment, one high-intensity broadband light source 200 may supply both the A-band and the B-band.

Figure 3:
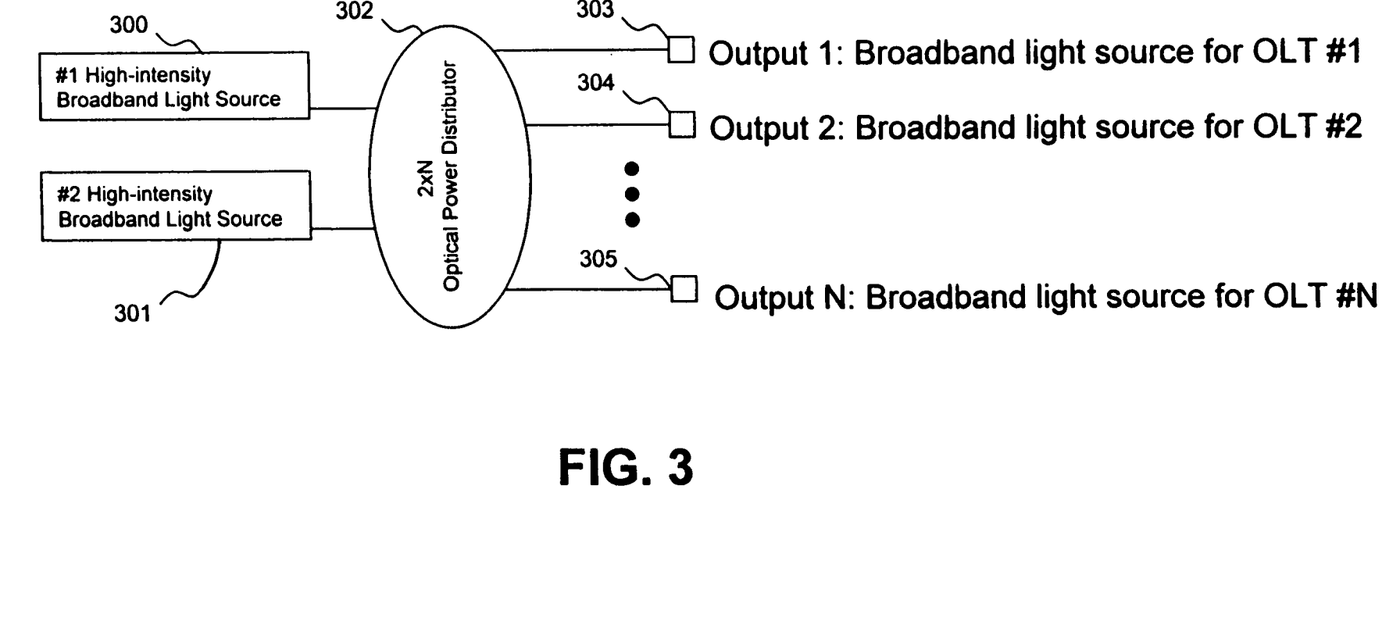
FIG. 3 shows an example of a shared broadband light source implementation with a 1:1 or 1+1 a fault recovery function for optical line terminals.

FIG. 3 illustrates an embodiment of a high-intensity broadband light source configuration that addresses the following problem. Because a high-intensity broadband light source supplies injected light for one or multiple optical networks, there is a problem of service interruption to all connected subscribers if there is trouble with the high-intensity broadband light source.

To resolve such a problem, the embodiment of FIG. 3 uses a method of troubleshooting with respect to the high-intensity broadband light source. FIG. 3 shows Number 1 high-intensity broadband light source 300, Number 2 high-intensity broadband light source 301, and 2×N optical power distributor 302. The output of No. 1 high-intensity broadband light source 300 is connected to a first input port of 2×N optical power distributor 302. The output of No. 2 high-intensity broadband light source 301 is connected to a second input port of 2×N optical power distributor 302. The 2×N optical power distributor 302 distributes the output light of high-intensity broadband light sources 300 and 301 to an N number of outputs 303-305 that are outputs for optical line terminals #1 through #N. Each of the output ports 303-305 of the optical power distributor 302 is connected to a respective broadband light source coupler of each of the optical line terminals 303-305.

For one embodiment, each of these two high-intensity broadband light sources 300 and 301 is operated at its rated optical output. The result is that each of the output ports 303-305 of the optical power distributor 302 obtains an optical output that is 3 dB greater than a structure without a fault recovery function. If one of the two high-intensity broadband light sources 300 or 301 experiences trouble (such a reduction in optical output) or fails, then optical power at each of the output ports 303-305 is the same as that of a structure without a fault recovery function.

The embodiment of FIG. 3 can be operated in another manner. If each of these two high-intensity broadband light sources 300 and 301 runs at half its rated optical output, then each of output ports 303-305 of the optical power distributor 302 has an optical output with an intensity the same as that of a structure without a fault recovery function. For that configuration, if one of the two high-intensity broadband light sources 300 or 301 experiences trouble (such a reduction in optical output) or fails, then the optical output at each of the output ports 303-305 can be the same as that of a structure without fault recovery function by raising the optical output of the high-intensity broadband light source 300 or 301 that did not fail to its rated output.

Figure 4:
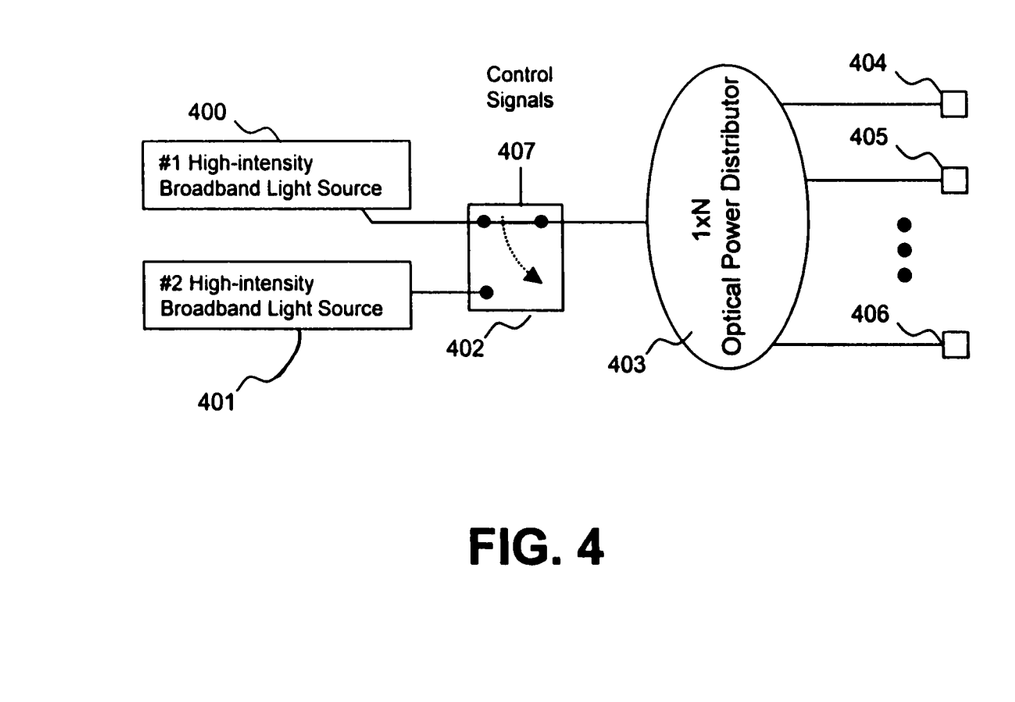
FIG. 4 shows another example of a shared broadband light source implementation with a 1:1 or a 1+1 fault recovery function for optical line terminals.

FIG. 4 illustrates another embodiment of a high-intensity broadband light source switch configuration. The embodiment of FIG. 4 includes No. 1 high-intensity broadband light source 400, No. 2 high intensity broadband light source 401, 2×1 optical path controller 402, and 1×N optical power distributor 403. The output of No. 1 high-intensity broadband light source 400 is connected to a No. 1 input port of 2×1 optical path controller 402. The output of a No. 2 high-intensity broadband light source 401 is connected to No. 2 input port of 2×N optical path controller 402. The output of 2×1 optical path controller 402 is connected to an input of 1×N optical power distributor 403. Control signals 407 control 2×1 optical path controller 402. Control signals 407 cause 2×1 optical path controller 402 to either provide as an output (1) the No. 1 high-intensity broadband light source 400 from input No. 1 or (2) the No. 2 high-intensity broadband light source 401 from input No. 2.

The 1×N optical power distributor 403 distributes injected light to an N number of output ports 404-406. Each of the output ports 404-406 of the optical power distributor 403 is connected to the respective broadband light source coupler of the respective optical line terminal.

The initial optical path of the optical path controller 402 is set between its No. 1 input port and the output port of controller 402, which connects the output light of No. 1 high-intensity broadband light source 400 to the optical power distributor 403. If No. 1 high-intensity broadband light source experiences trouble (e.g., a lower optical output) or fails, then the optical path controller switches the optical path such that the optical path is now between the No. 2 input port of controller 402 and the output port of controller 402, which connects the output light of No. 2 high-intensity broadband light source 401 to the optical power distributor 403.

Figure 5:
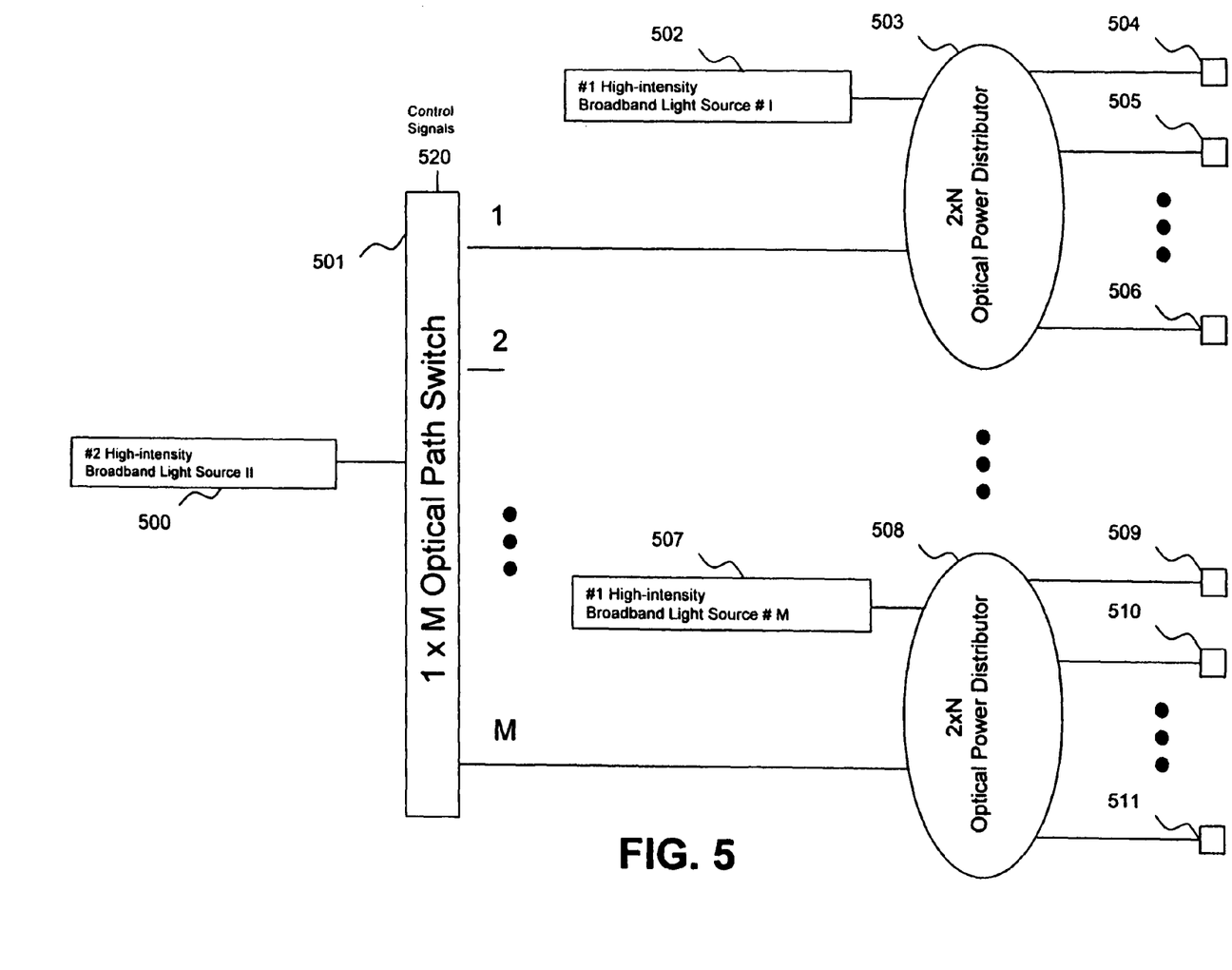
FIG. 5 shows an example of shared broadband light source implementation with a 1:M fault recovery function for optical line terminals.

FIG. 5 illustrates another embodiment of high-intensity broadband light source switching. The embodiments of FIGS. 3 and 4 require a second backup high-intensity broadband light source (i.e., No. 2 light source 301 for FIG. 3 and No. 2 light source 401 for FIG. 4) for fault recovery purposes in addition to the first primary high-intensity broadband light source (i.e., No. 1 light source 300 for FIG. 3 and No. 1 light source 400 for FIG. 4). The central base station may have a large number of optical line terminals. If so, when executing 1:1 or 1+1 protective switching for the embodiments of FIGS. 3 and 4, a large number of backup No. 2 high-intensity broadband light sources would be required, which would increase costs. In order to decrease the number of backup No. 2 high-intensity broadband switches that are required to provide fault protection, the embodiment of FIG. 5 uses 1:M or L:M protective switching.

The embodiment shown in FIG. 5 includes an M number of No. 1 high-intensity broadband light sources 502-507, optical power distributors 503-508, one No. 2 high-intensity broadband light source 500, and a 1×M optical path switch 501. The output of each of the No. 1 high-intensity broadband light sources #1 through #M 502-507 is connected to a respective No. 1 input port of a respective optical power distributor of the 2×N optical power distributors 503-508. The output of No. 2 high-intensity broadband light source 500 is connected to the input port of 1×M optical path switch 501. The 1×M optical path switch 501 switches the optical path between the input port of switch 501 and M number of output ports of switch 501 according to control signals 520. Each of the M output ports of 1×M optical path switch 501 is connected to a respective No. 2 input port of a respective optical power distributor of optical power distributors 503-508.

If one of the M number of No. 1 high-intensity broadband light sources 502-507 experiences trouble (e.g., a reduction in optical output) or fails, then the 1×M optical 501 path switch can be used to solve the problem. The control signals 520 applied to 1×M optical path switch 501 can be used to provide a path between the output of No. 2 high-intensity broadband light source 500 and the input of the 2×N optical power distributor of optical power distributors 503-508 that has a failed No. 1 high-intensity broadband light source. In other words, under the control of control signals 520, the 1×M optical path switch 501 can substitute the optical output of No. 2 high-intensity broadband light source 500 for the optical output of one of the failed No. 1 high-intensity broadband light source of M light sources 502-507.

For an alternative embodiment, an L×M optical path switch is used in place of 1×M optical path switch 501, wherein L is an integer greater than 1. For that alternative embodiment, an L number of No. 2 high-intensity broadband light sources are coupled as inputs to the L×M optical path switch and replace the single No. 2 high-intensity broadband light source 500. This alternative embodiment provides L×M protective switching. For this alternative embodiment, the L number of No. 2 high-intensity broadband light sources can be used to provide output light to the 2×N optical power distributors of optical power distributors 503-508 that have respective failed No. 1 high-intensity broadband light sources 502-507.

Figure 6:
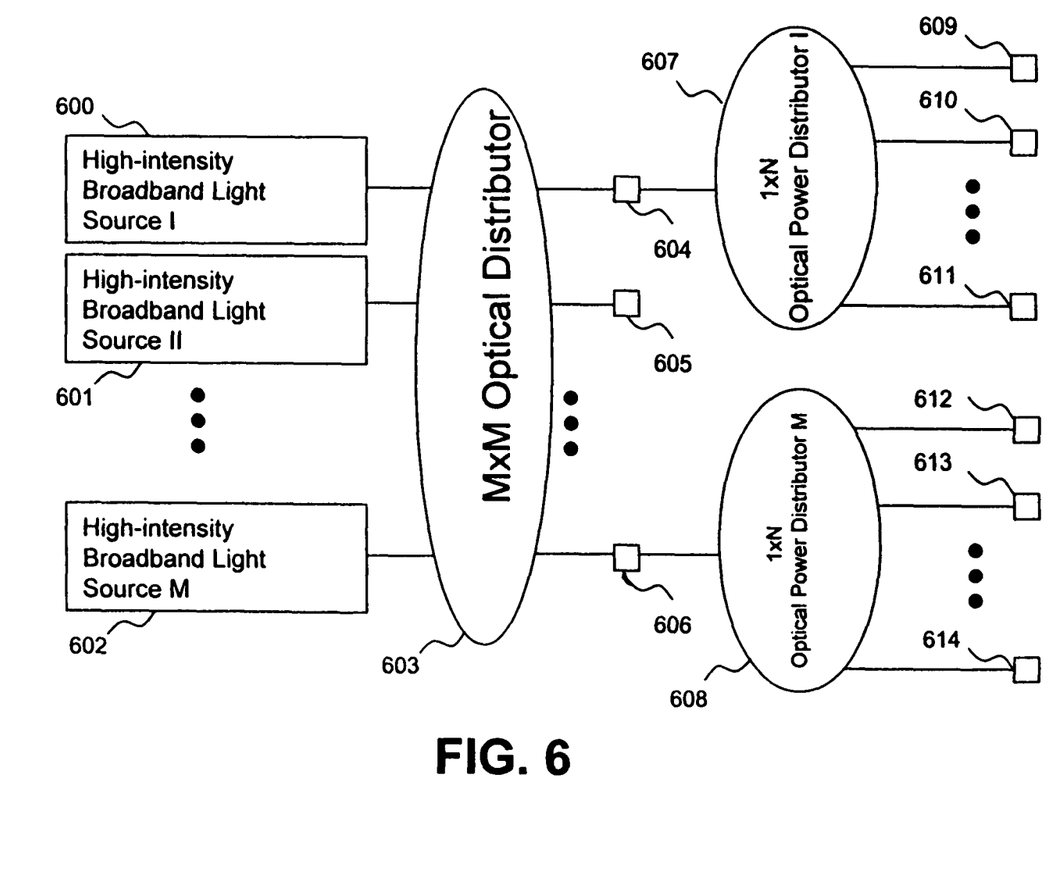
FIG. 6 shows another example of broadband light source sharing for a number of optical line terminals.

FIG. 6 illustrates an embodiment wherein broadband light sources are shared among a number of optical line terminals. The embodiment of FIG. 6 includes an M number of high-intensity broadband light sources 600-602, an M×M optical power distributor 603, and an M number of 1×N optical power distributors 607-608. Apart from distribution loss and the additional loss caused by M×M optical power distributor 603, the optical power at the M number of output ports 604-606 of the M×M optical power distributor 603 is similar to that of the optical power of the high-intensity broadband light sources 600-602. The M×M optical distributor 603 averages the combined optical power of the M number of high-intensity broadband light sources 600-602 and that averaged optical power appears at outputs 604-606. For one embodiment of the invention, the optical power of each of the M number of high-intensity broadband light sources 600-602 is substantially equal. For alternative embodiments, however, the optical output power of each of the M number high-intensity broadband light sources 600-602 need not be equal.

The M number of 1×N optical power distributors 607-608 connected to the respective output ports of M×M optical power distributor 603 divide and distribute the optical signals to respective outputs 609-614 going to optical line terminals, similar to the arrangement shown in FIG. 2.

The embodiment of FIG. 6 is similar to the embodiment of FIG. 2, except that for FIG. 6 there is a M×M optical distributor 603, an M number of high-intensity light sources 600-602, M number of outputs 604-606, and M number of 1×N optical power distributors 607-608.

For one embodiment of FIG. 6, however, if one of M-number of high-intensity broadband light sources 600-602 encounters trouble (e.g., reduction in optical output) or fails, the intensity of broadband light injected to each optical line terminal through the optical output ports 609-614 decreases as much as 1/M. Therefore, the structure of FIG. 6 has an advantage of minimizing the effect to the entire system of trouble or a failure with respect to a specific high-intensity broadband light source of high-intensity broadband light sources 600-602.

Alternatively, for the embodiment of FIG. 6, broadband light as large as F/M can be provided at ordinary times at the M number of output ports 604-606 by designing the rated output of each of the M number of high-intensity light sources 600-602 as large as F/M, where F is a fraction of the number one. For example, each of the M number of high-intensity broadband light sources 600-602 could be designed to operate under ordinary condition at 70% (or some other percentage or fraction) of normal operating optical power. When one of the M number of high-intensity broadband light sources 600-602 experiences trouble (for example, that reduces optical output power) or fails, then the other high-intensity light sources 600-602 that are not failing (or not experiencing trouble) can have their power boosted so that they are operating at full (100%) normal operating optical power.

For yet another alternative embodiment, each of the M number of high-intensity broadband light sources 600-602 is operated at normal rated optical output during ordinary operation. If, however, one of the M number of high-intensity broadband light sources fails or experiences trouble (e.g., a reduction in optical output), then the other ones of the M number of high-intensity broadband light sources are operated at higher than normal operating power in order to compensate.

For the embodiments of FIGS. 2-6, one high-intensity broadband light source provides broadband light for a number of optical line terminals. For alternative embodiments, in order to cut off a supply of broadband light to a specific optical line terminal, an On/Off optical switch is inserted between the output port of the optical power distributor and the broadband light source coupler of the optical line terminal.

Figure 7:
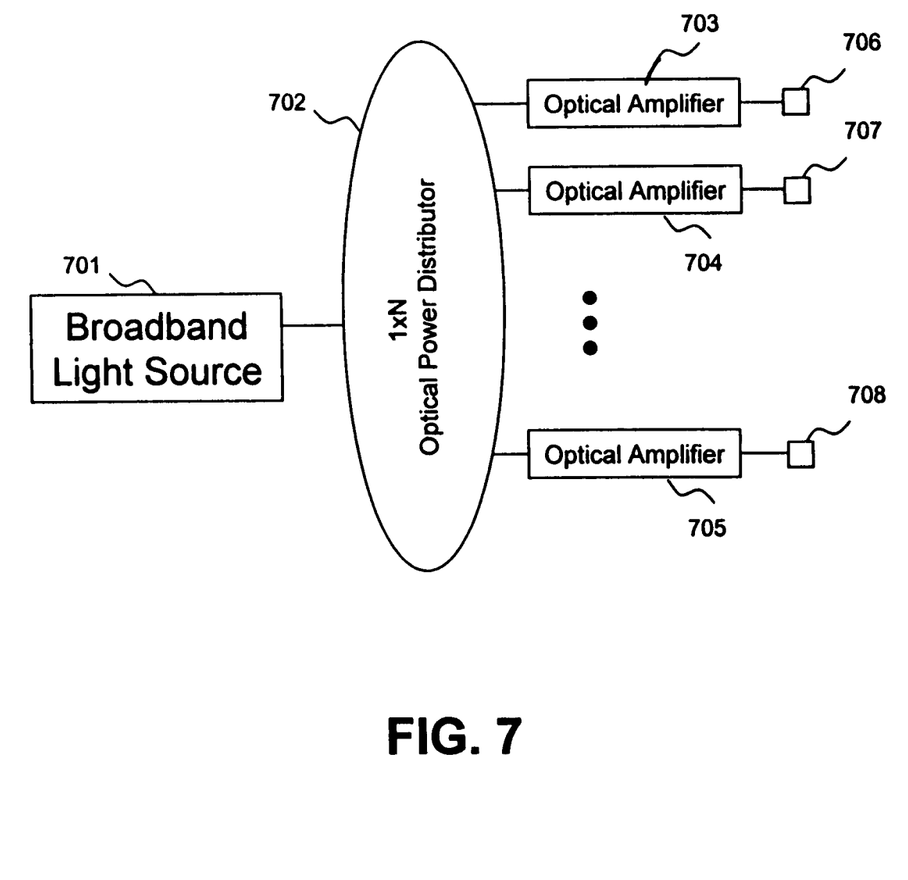
FIG. 7 shows an example of using a shared broadband light source and optical amplifiers for a number of optical line terminals.

FIG. 7 illustrates another embodiment of a broadband light source arrangement for optical line terminals. The embodiment of FIG. 7 includes broadband light source 701, a 1×N optical power distributor 702, and a number of optical amplifiers 703-705. The output ports 706-708 of the respective optical amplifiers 706-708 are connected to respective broadband light source couplers of respective optical line terminals.

The broadband light source 701 of FIG. 7 is a regular lower-intensity broadband light source, not a high-intensity broadband light source. The optical output of broadband light source 701, after being distributed by 1×N optical power distributor 702, is amplified by optical amplifiers 703-705. An advantage of the embodiment of FIG. 7 is that the regular lower-intensity broadband light source 701 is less expensive than a high-intensity broadband light source. The optical amplifiers 703-705 make up for the fact that a high-intensity broadband light source is not being used. But for one embodiment, the optical amplifiers 703-705 are standard components that do not add much to the overall cost of the network. Therefore, by using a shared output of a lower cost standard (not high-intensity) broadband light source 701 and standard relatively low-cost optical amplifiers 703-705, the overall cost of supplying broadband light to each optical terminal can be minimized.

Figure 8A:
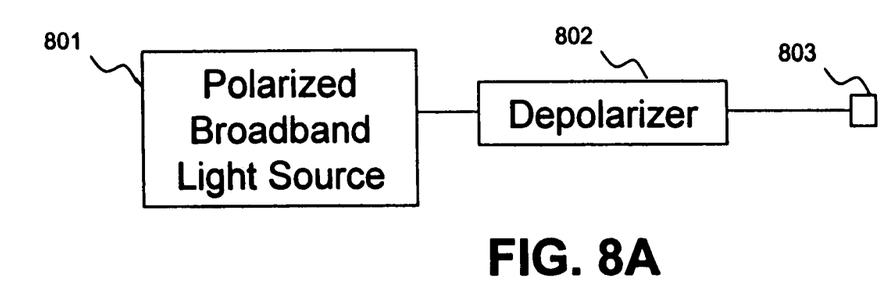
FIGS. 8A and 8B show examples of polarized broadband light sources for optical line terminals.
Figure 8B:
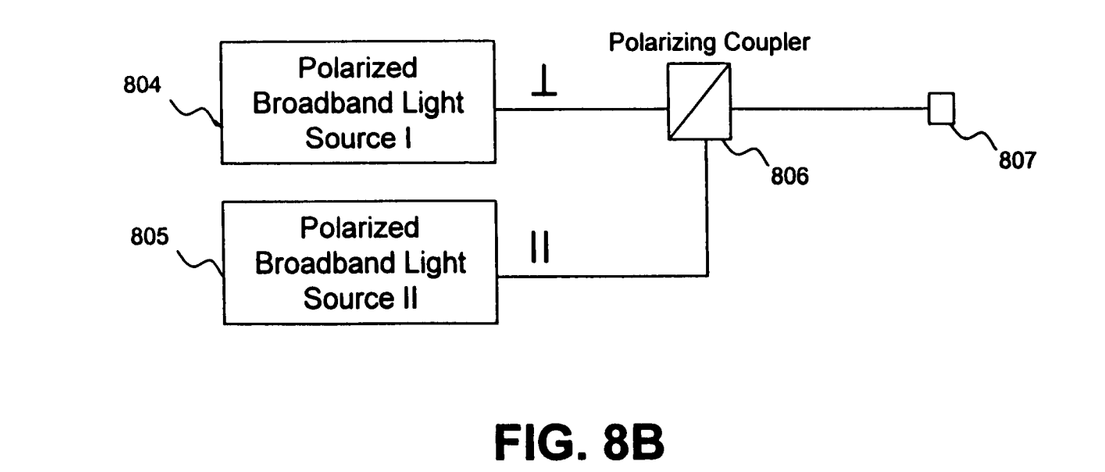

FIGS. 8A and 8B show embodiments of the invention that employ regular intensity (not high-intensity) broadband light sources 801, 804, and 805 that emit polarized light that is used as the injected light in a wavelength-division multiple access network.

The high-intensity broadband light sources for the embodiments of the invention described in connection with FIGS. 2-6 emit unpolarized light that is incoherent. The regular-intensity broadband light source 701 of FIG. 7 emits polarized light, however, for one embodiment. For another embodiment, however, light source 701 of FIG. 7 emits unpolarized light.

For one embodiment, a Fabry-Perot laser diode, a semiconductor optical amplifier, or an optical modulator is used as a transmitter of the optical transceiver of a wavelength-division multiple access passive optical network using injected light. Optical elements used for transmitters may be affected, however, by the polarization state of the injected light. To help to overcome that problem, the embodiments of FIGS. 8A and 8B show ways to provide polarization-free light even with polarized broadband light sources.

Regular-intensity broadband light sources using semiconductors have been actively developed in recent years. For a semiconductor broadband light source, such as broadband light source 701 of FIG. 7 or broadband light sources 801, 804, or 805 of FIG. 8, optical output has a specific polarization state. The status of polarization injected into optical transmitters changes according to the optical path from the broadband light source to the optical transceiver. Thus, as injected light of random polarization is injected into the optical transmitter, transmission quality may deteriorate. So if a broadband light source is used that generates polarized light, the output light nevertheless needs to be free from polarization.

To make polarization-free broadband light source, quasi-unpolarized broadband light at output 803 can be obtained by making the output light of polarized regular-intensity broadband light source 801 pass through the optical depolarizer 802, as shown in FIG. 8A.

FIG. 8B shows another way to avoid polarized light. A polarization-free optical output is obtained at output 807 by injecting the respective outputs of two polarized regular-intensity broadband light sources 804 and 805 into polarizing coupler 806. For the embodiment of FIG. 8B, the output of polarized broadband light source 804 is polarized in one direction and the output of polarized broadband light source 805 is polarized broadband light source 805 is polarized in a different direction, so the polarizations are interlinked.

The embodiments of the invention discussed above in connection with FIGS. 2-7, 8A, and 8B involve various broadband light sources that would be used for the A-band and repeated for the B-band.

Figure 9:
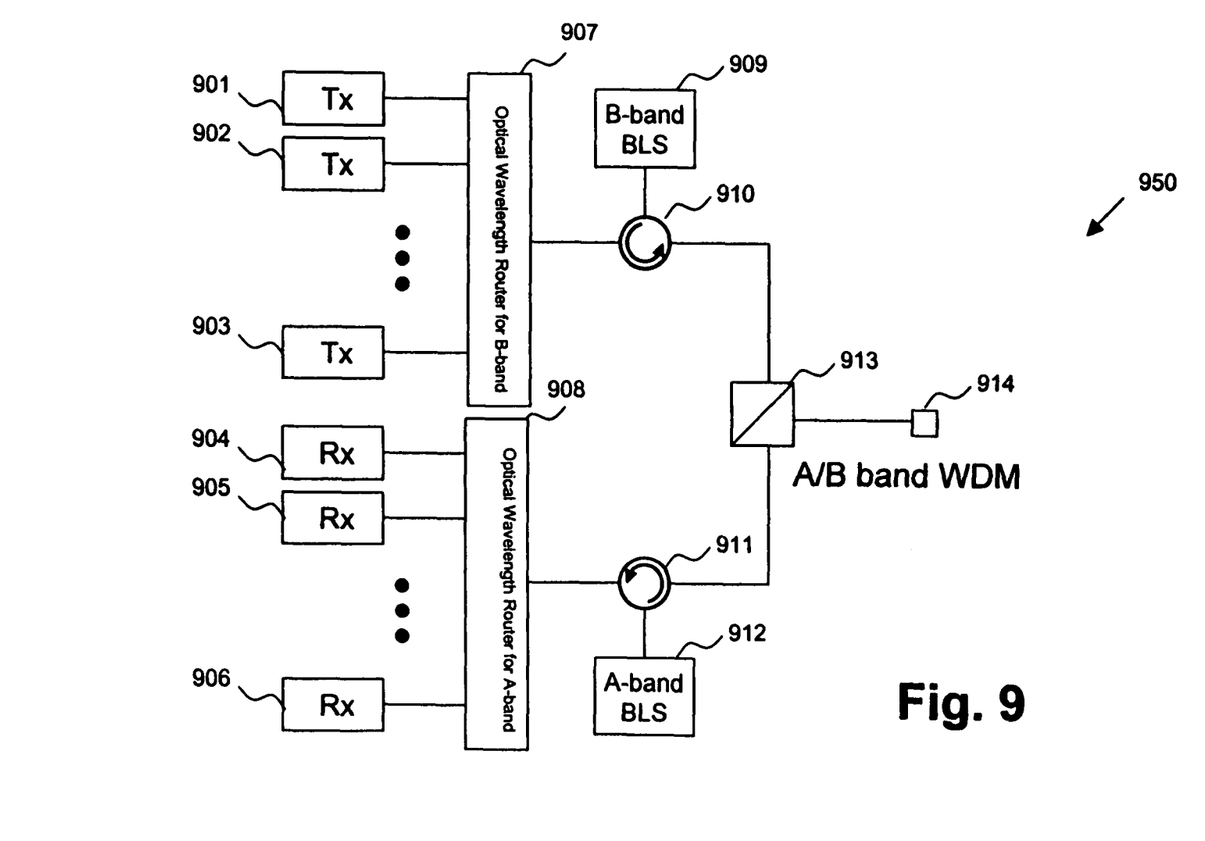
FIG. 9 is a block diagram of an optical line terminal that uses a broadband wavelength-division multiplexer/demultiplexer and two optical wavelength routers.

FIG. 9 is a block diagram of an embodiment of the invention having a different architecture with respect to optical wavelength routers in optical line terminals. For the embodiment of FIG. 9, there is a separate optical wavelength router 908 for the A-band and a separate optical wavelength router 807 for the B-band. For one embodiment, the A-band broadband light source 912 and the B-band broadband light source 909 can each be a regular-intensity broadband light source. For another embodiment of the invention, the A-band broadband light source 812 and the B-band broadband light source 909 can each be a high-intensity broadband light source.

FIG. 9 illustrates optical line terminal 950. Optical line terminal 950 includes broadband light source 912 for the A-band, broadband light source 909 for the B-band, a number of optical transmitters 901-903 operating at individual wavelengths within the B-band, a number of optical receivers 904-906 configured to receive wavelengths within the A-band, optical wavelength router 908 for the A-band, optical wavelength router 907 for the B-band, optical circulator 911 for the A-band, optical circulator 910 for the B-band, broadband wavelength-division multiplexer/demultiplexer 913 for the A and B-bands, and optical connector 914.

As done by conventional wavelength-division multiple access optical networks, optical line terminal 950 of FIG. 9 assigns downstream signals to the B-band for one optical line and assigns upstream signals to the A-band.

The B-band broadband light source 909 supplies injected light to optical transmitters 901-903 through optical circulator 910 and optical wavelength router 907 for the band B. Downstream signals generated from optical transmitters 901-903 using injected light are multiplexed at the optical wavelength router 907 for the band B and transmitted to the optical connector 914 through the optical circulator 910 and the broadband optical wavelength-division multiplexer/demultiplexer 913. The optical connector 914 is connected to a remote node through optical lines.

The A-band broadband light source 912, meanwhile, supplies injected light of the optical transmitter of an optical subscriber (i.e., remote node) through the optical circulator 911, the broadband optical wavelength-division multiplexer 913, through optical connector 914 and an optical line to a remote node. Upstream optical signals multiplexed by the remote node are demultiplexed by broadband optical wavelength-division multiplexer/demultiplexer 913, optical circulator 911, and optical wavelength router 908 for the A-band and transmitted to each of the optical receivers 904-906.

To increase the degree of integration, optical transmitters 901-903 can be produced as one module and integrated with B-band wavelength-division multiplexer/demultiplexer (router) 907. In addition, optical receivers 904-906 can be produced as one module and integrated with the A-band wavelength-division multiplexer/demultiplexer (router) 908. For one embodiment, either modularization of individual optical elements is employed or a planar integrated optical waveguide technology is used. Modularization of all or part of optical line terminal 950 helps to reduce space occupied by the central base station and helps to minimize costs.

Embodiments of the invention discussed above with reference to FIGS. 2-7, 8A, 8B, and 9 can help to simplify each of a number of optical line terminals of a central base station and help to reduce the amount of space occupied by the central base station. If an optical network is widely used, a number of optical line terminals are required. For such a case, an improvement in the degree of integration becomes important. Embodiments of the invention help to reduce cost by the sharing of parts of the optical line terminals, thereby helping to decrease power consumption.

Because certain embodiments of the invention provide methods for troubleshooting various broadband light sources, the reliability of an optical network can be maximized and a stable high-quality transmission service can be offered to each subscriber.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
a first high-intensity broadband light source;
an optical switch coupled to the first high-intensity broadband light source;
a plurality of optical power distributors coupled to the optical switch comprising
a first optical power distributor comprising a first input port coupled to a first output port of the optical switch, the first optical power distributor comprising a first number of output ports to distribute in a shared manner an output power of the high-intensity broadband light source, the first number of output ports comprising a first output port and a second output port;
a second high-intensity broadband light source coupled to a second input port of the first optical power distributor;
a second optical power distributor coupled to a second output of the optical switch, the second optical power distributor comprising a second number of output ports; and
a first plurality of optical line terminals comprising a first optical line terminal and a second optical line terminal, wherein the first optical line terminal is connected to the first output port of the first optical power distributor to optically couple the first high-intensity broadband light source to a first remote node to service a first plurality of optical subscribers, and the second optical line terminal is connected to the second output port of the first optical power distributor to optically couple the first high-intensity broadband light source to a second remote node to service a second plurality of optical subscribers.

2. The apparatus of claim 1, wherein the output of the high-intensity broadband light source is incoherent light.

3. The apparatus of claim 1, wherein the high-intensity broadband light source is for a first band of light.

4. The apparatus of claim 1, wherein the first optical power distributor is a fiber optic directional coupler.

5. The apparatus of claim 1, wherein the first optical power distributor comprises planar lightwave circuits.

6. An apparatus comprising:
a plurality of first high-intensity broadband light sources;
a plurality of optical power distributors coupled to respective ones of the plurality of first high-intensity broadband light sources, each of the plurality of optical power distributors having a plurality of outputs coupled to respective ones of a plurality of optical line terminals;
a second high-intensity broadband light source;
an optical path switch having an input coupled to an output of the second high-intensity broadband light source and having a plurality of outputs, wherein each output of the plurality of outputs of the optical path switch is coupled to an input of a respective one of the plurality of optical power distributors, wherein the optical path switch couples the output of the second high-intensity broadband light source to the input of one of the plurality of optical power distributors.

7. The apparatus of claim 6, wherein the optical path switch is controlled by a control signal.

8. An apparatus comprising:

a first broadband light source;

an optical switch coupled to the first high-intensity broadband light source;

a plurality of optical power distributors coupled to the optical switch comprising a first optical power distributor comprising a first input port coupled to a first output port of the optical switch, and a first plurality of outputs to distribute in a shared manner an output power of the first broadband light source comprising an injected light, the first plurality of outputs comprising a first output and a second output;

a second broadband light source coupled to a second input port of the first optical power distributor;

a second optical power distributor coupled to a second output of the optical switch, the second optical power distributor comprising a second plurality of outputs;

a plurality of optical amplifiers comprising a first optical amplifier and a second optical amplifier coupled to respective ones of the first plurality of outputs of the first optical power distributor; and a plurality of optical line terminals connected to the plurality of optical amplifiers, the plurality of optical line terminals comprising a first optical line terminal to couple to a first remote node to service a first plurality of optical subscribers and a second optical line terminal to couple to a second remote node to service a second plurality of optical subscribers, wherein the first optical amplifier is coupled to the first optical line terminal, and the second optical amplifier is coupled to the second optical line terminal to provide the injected light of the first broadband light source to transmitters within at least the first optical line terminal and the second optical line terminal.

9. The apparatus of claim 8, wherein respective outputs of the plurality of optical amplifiers are coupled to respective ones of the plurality of broadband light source couplers of respective optical line terminals.

\* \* \* \* \*